United States Patent
Loy et al.

(10) Patent No.: US 6,470,031 B1
(45) Date of Patent: Oct. 22, 2002

(54) METHOD AND APPARATUS FOR ACCURATE PACKET TIME STAMPING

(75) Inventors: Dietmar Loy, Sausalito; Thomas Reitmayr, San Francisco, both of CA (US)

(73) Assignee: Coactive Networks, Inc., Sausalito, CA (US)

(*) Notice: Subject to any disclaimer, the term of this patent is extended or adjusted under 35 U.S.C. 154(b) by 18 days.

(21) Appl. No.: 09/654,973

(22) Filed: Sep. 5, 2000

(51) Int. Cl.[7] .............................. H04J 3/06; H04L 7/00; G06F 15/16
(52) U.S. Cl. ..................... 370/503; 370/512; 709/248; 375/356
(58) Field of Search ................................ 370/350, 394, 370/503, 512, 516, 509; 709/200, 224, 232, 240, 248, 250, 400; 375/354–356; 713/178

(56) References Cited

U.S. PATENT DOCUMENTS

| | | | |
|---|---|---|---|
| 5,566,180 A | * 10/1996 | Eidson et al. ................ 370/516 |
| 5,761,430 A | 6/1998 | Gross et al. ................. 709/225 |
| 6,108,713 A | 8/2000 | Sambamurthy et al. ..... 709/250 |
| 6,215,767 B1 | * 4/2001 | Li ................................ 370/230 |
| 6,247,058 B1 | * 6/2001 | Miller et al. ................. 709/240 |
| 6,347,084 B1 | * 2/2002 | Hulyalkar et al. .......... 370/503 |
| 6,357,007 B1 | * 3/2002 | Cromer et al. .............. 713/178 |

OTHER PUBLICATIONS

Tavana et al, "Hardware Time Stamping and Registration of Packetized Data Method and System", US 2002/0024973 A1.*
Hedayat et al, "Method and System for Transmit Time Stamp Insertion in a Hardware Time Stamp System for Packetized Data Networks", US 2002/0021717.*
Elliot, "Precise Network Time Transfer", US 2002/0039370 A1.*

* cited by examiner

*Primary Examiner*—Wellington Chin
*Assistant Examiner*—Maikhanh Tran
(74) *Attorney, Agent, or Firm*—Sawyer Law Group LLP

(57) ABSTRACT

The present invention provides a method and apparatus for accurate packet time stamping in a network. The apparatus includes a time stamping logic, where the time stamping logic detects when a packet is transmitted or received; and a time source, where time information from the time source is latched when the time stamping logic detects the packet. In the preferred embodiment, the time stamping logic monitors packet traffic on a bus. When the time stamping logic detects a packet, a time stamping signal is generated which latches time information from the time source. The time information may then be used to measure the transmission delay for the packet for synchronizing the clocks at the transmitting and receiving nodes.

10 Claims, 3 Drawing Sheets

METHOD AND APPARATUS FOR ACCURATE PACKET TIME STAMPING

FIELD OF THE INVENTION

The present invention relates to computer networks, and more particularly to the transmission of data packets in the networks.

BACKGROUND OF THE INVENTION

Network protocols, such as those for Local Area Networks (LANs) or Wide Area Networks (WANs) are well known in the art. Conventionally, data packets are transmitted between network nodes using differently routes. They may arrive at the destination node out of order and must be reordered. One method of determining the proper order is to use time stamps. The packets are reordered based upon the times at which they were transmitted by the transmitting node. To accomplish this, the transmitting and the receiving nodes must function within the same notion of time. For this reason, the clocks at the transmitting and receiving nodes must be synchronized. Algorithms for synchronizing the clocks are well known in the art.

An important parameter in synchronizing the clocks is the delay, i.e., the time required for a packet to travel from the transmitting node to the receiving node. If the actual delay is known for two nodes, then the clocks at the nodes may be synchronized by comparing the actual delay with the measured delay. Thus, the precision in detecting the transmission and arrival of a packet is key in obtaining an accurate measured delay. In this specification, this detecting is referred to as "time stamping".

Conventional methods use software to perform the time stamping. However, software methods involve several unknown time delays between the time the packet actually arrives or is transmitted and the time the software detects its arrival or transmission. For example, delay may occur for the software to obtain information from a buffer or to arbitrate access to a bus. These delays are unpredictable, and thus the time stamping is too inaccurate for clock synchronization.

Accordingly, there exists a need for a method and apparatus for accurate packet time stamping. The present invention addresses such a need.

SUMMARY OF THE INVENTION

The present invention provides a method and apparatus for accurate packet time stamping in a network. The apparatus includes a time stamping logic, where the time stamping logic detects when a packet is transmitted or received; and a time source, where time information from the time source is latched when the time stamping logic detects the packet. In the preferred embodiment, the time stamping logic monitors packet traffic on a bus. When the time stamping logic detects a packet, a time stamping signal is generated which latches time information from the time source. The time information may then be used to measure the transmission delay for the packet for synchronizing the clocks at the transmitting and receiving nodes.

DETAILED DESCRIPTION

The present invention provides a method and apparatus for accurate packet time stamping. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and apparatus in accordance with the present invention provides a time stamping logic which monitors packet traffic on a bus. When the time stamping logic detects a packet, a time stamping signal is generated which latches time information from a time source. The time information may then be used to measure the transmission delay for the packet for synchronization of the clocks at the transmitting and receiving nodes.

To more particularly describe the features of the present invention, please refer to FIGS. 1 through 3 in conjunction with the discussion below.

Figure 1:
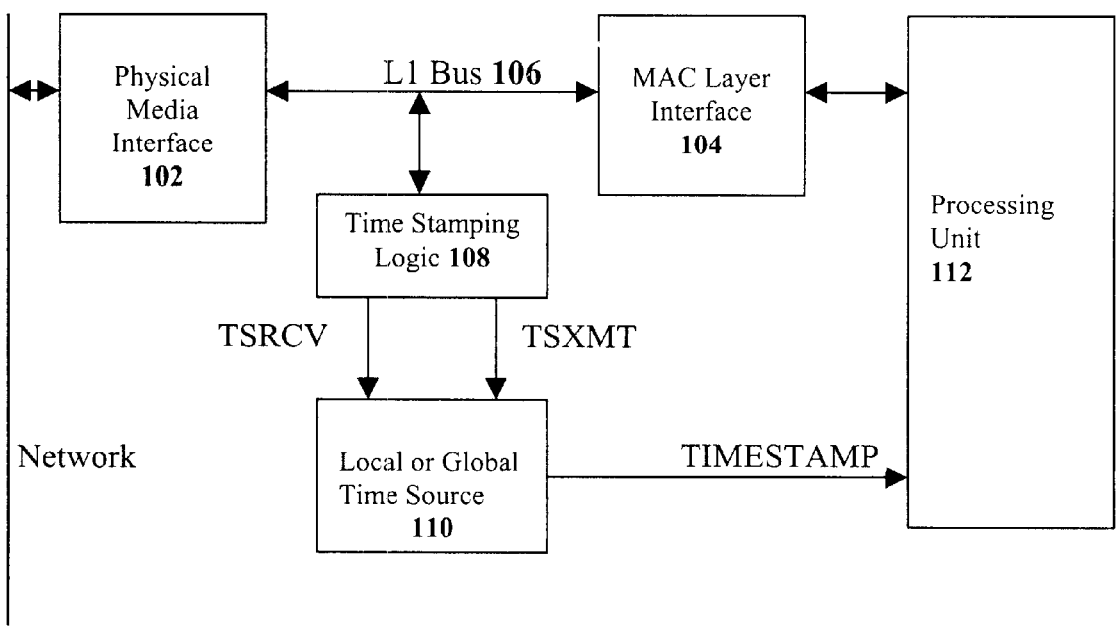
FIG. 1 is a logical diagram illustrating a preferred embodiment of an apparatus for accurate packet time stamping in accordance with the present invention.

FIG. 1 is a logical diagram illustrating a preferred embodiment of an apparatus for accurate packet time stamping in accordance with the present invention. In the preferred embodiment, the apparatus is implemented in hardware and resides in each node and any other location at which time information is desired. The apparatus comprises a Physical Media (PHY) interface 102, a Media Access Control (MAC) Layer interface 104, and a bus 106 between the PHY 102 and the MAC 104 layers. Monitoring the traffic on the bus 106 is a time stamping logic 108. The time stamping logic 108 is capable of generating time stamp signals and sending them to the time source or clock 110. The time stamping logic 108 generates a time stamp receive signal (TSRCV) when it detects the receipt of a packet on the bus 106, and generates a time stamp transmit signal (TSXMT) when it detects the transmission of a packet on the bus 106. This signal causes time information from the time source 110 to be latched. The time source 110 can be a local or global time source. The latched time information then may be sent to the processing unit 112 where it is analyzed.

Figure 2:
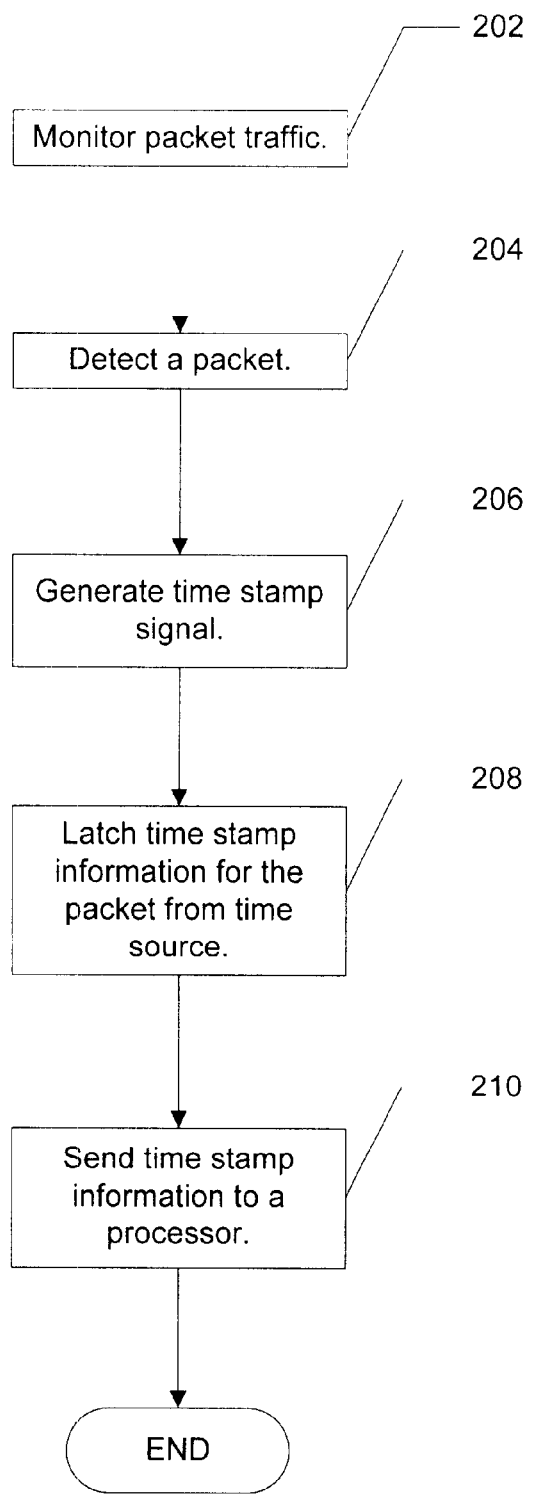
FIG. 2 is a flow chart illustrating a preferred embodiment of a method for accurate packet time stamping in accordance with the present invention.

FIG. 2 is a flow chart illustrating a preferred embodiment of a method for accurate packet time stamping in accordance with the present invention. First, the time stamping logic 108 monitors the packet traffic, via step 202. In the preferred embodiment, the monitoring occurs at the bus 106 between the PHY 102 and the MAC 104 layers. However, one of ordinary skill in the art will understand that the monitoring may occur at other locations, such as between the MAXC layer 104 and the processing unit 112, or between the network and the PHY layer 102, without departing from the spirit and scope of the present invention.

Figure 3A:
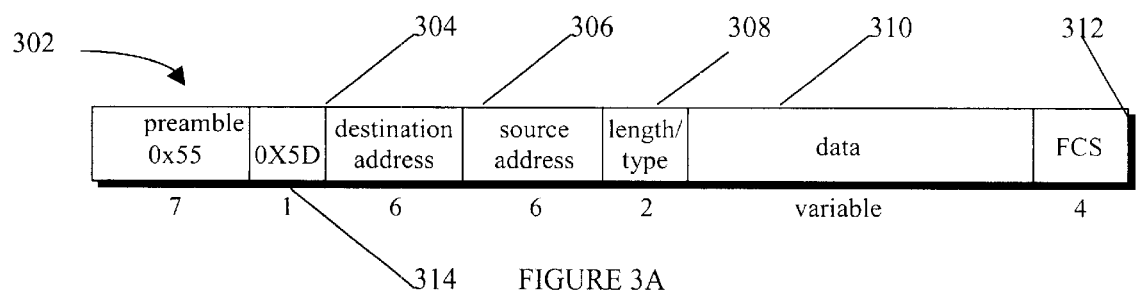
FIG. 3A illustrates the structure of a conventional data packet.

Next, the time stamping logic 108 detects a packet, via step 204. In the preferred embodiment, the time stamping logic 108 detects the last byte of the preamble of a packet. FIG. 3A illustrates the structure of a conventional data packet. The packet comprises preamble bytes 302, destination address bytes 304, source address bytes 306, length/type bytes 308, data bytes 310, and Frame Check Sequence (FCS) bytes 312. Conventionally, the preamble 302 ends with a "5D" symbol 314. The packet is "detected", via step 204, when this 5D symbol 314 is detected by the time stamping logic 108.

Figure 3B:
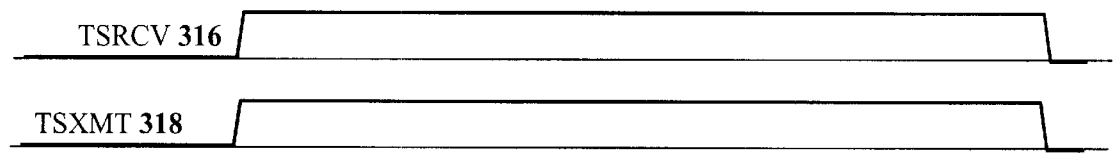
FIG. 3B illustrates the timing diagrams for two time stamp signals generated in the preferred embodiment.

Returning to FIG. 2, when the packet is detected, via step 204, then the time stamping logic 108 generates a time stamp signal, via step 206. FIG. 3B illustrates the timing diagrams for two time stamp signals generated in the preferred embodiment. When the packet detected by the time stamping logic 108 is received by the node in which the apparatus resides, then a TSRCV signal 316 is generated. When the packet detected is transmitted by the node, then a TSXMT signal 318 is generated.

In the preferred embodiment, the signals 316, 318 are generated when the AB symbol in the preamble 314 of the packet is detected. However, the TSRCV signal 316 and the TSXMT signal 318 may be generated when other bytes of the packet are detected, without departing from the spirit and scope of the present invention. For example, the time stamping logic 108 may detect the beginning of the data bytes 310 (FIG. 3A) or the ending byte 312 of the packet. Detecting the beginning of the data bytes 310 will provide the time at which the actual data is received or transmitted. Detecting the ending byte 312 allows the option of not generating a time stamp signal when the FCS bytes 312 indicate that the packet is corrupted. Since corrupted packets are discarded, this saves the time and resources otherwise needed to process time stamp signals for the corrupted packet.

Although the time stamp signals are illustrated as a signal transitioning from low to high when the packet is detected, one of ordinary skill in the art will understand that any change in the signals may be used to indicate the detection without departing from the spirit and scope of the present invention.

Returning to FIG. 2, the time stamp signal generated via step 206 then latches time stamp information for the packet from the time source 110, via step 208. In the preferred embodiment, the detecting step 204, the generating step 206, and the latching step 208 occur within one clock cycle at the interface between the PHY layer 102 and the MAC layer 104. The time stamp information is then sent to the processing unit 112, via step 210. The processing unit 112 may then use the time stamp information to measure the transmission delay for the packet, to synchronize the clocks between the transmitting and receiving nodes, or some other purpose.

A method and apparatus for accurate packet time stamping has been disclosed. The method and apparatus comprises a time stamping logic which monitors packet traffic on a bus. When the time stamping logic detects a packet, a time stamping signal is generated which latches time information from a time source. The time information may then be used to measure the transmission delay for the packet for synchronizing the clocks at the transmitting and receiving nodes.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for packet time stamping in a network, comprising:
    a time stamping logic, wherein the time stamping logic detects when a packet is transmitted or received;
    a time source, wherein time information from the time source is latched when the time stamping logic detects the packet;
    a bus coupled to the time stamping logic, wherein the time stamping logic monitors the packet traffic on the bus;
    a physical media (PHY) layer interface coupled to the bus; and
    a media access controller (MAC) layer interface coupled to the bus.

2. An apparatus for packet time stamping in a network, comprising:
    a time stamping logic, wherein the time stamping logic detects when a packet is transmitted or received;
    a time source, wherein time information from the time source is latched when the time stamping logic detects the packet;
    a bus coupled to the time stamping logic, wherein the time stamping logic monitors the packet traffic on the bus;
    a MAC layer interface coupled to the bus; and
    a processing unit coupled to the bus.

3. An apparatus for packet time stamping in a network, comprising:
    a bus;
    a PHY interface layer coupled to the bus;
    a MAC interface layer coupled to the bus;
    a time stamping logic coupled to the bus, wherein the time stamping logic monitors packet traffic on the bus, wherein the time stamping logic generates a time stamp signal when a packet on the bus is detected; and
    a time source, wherein time information from the time source is latched when the time stamping logic generates the time stamp signal.

4. A method for packet time stamping in a network, comprising the steps of:
    (a) monitoring packet traffic on a bus between a PHY layer interface and a MAC layer interface;
    (b) detecting a packet on the bus;
    (c) generating a time stamp signal; and
    (d) latching a time stamp information for the detected packet from a time source.

5. A method for packet time stamping in a network, comprising the steps of:
    (a) monitoring packet traffic on a bus between the network and a PHY layer interface;
    (b) detecting a packet on the bus;
    (c) generating a time stamp signal; and
    (d) latching a time stamp information for the detected packet from a time source.

6. A method for packet time stamping in a network, comprising the steps of:
    (a) monitoring packet traffic on a bus between a MAC layer interface and a processing unit;
    (b) detecting a packet on the bus;
    (c) generating a time stamp signal; and
    (d) latching a time stamp information for the detected packet from a time source.

7. A method for packet time stamping in a network, comprising the steps of:

(a) monitoring packet traffic on a bus;
(b) detecting a beginning byte of a data of the packet;
(c) generating a time stamp signal; and
(d) latching a time stamp information for the detected packet from a time source.

8. A method for packet time stamping in a network, comprising the steps of:
   (a) monitoring packet traffic on a bus;
   (b) detecting an ending byte of the packet;
   (c) generating a time stamp signal; and
   (d) latching a time stamp information for the detected packet from a time source.

9. A method for packet time stamping in network, comprising the steps of:
   (a) monitoring packet traffic on a bus;
   (b) detecting a packet on the bus;
   (c) generating a time stamp signal, wherein steps (b) through (c) occur within one clock cycle at an interface between a PHY layer and a MAC layer; and
   (d) latching a time stamp information for the detected packet from a time source.

10. An apparatus for packet time stamping in a network, comprising:
    means for monitoring packet traffic on a bus, wherein the monitoring means comprises a means for monitoring packet traffic on the bus between a PHY layer interface and a MAC layer interface;
    means for detecting a packet on the bus;
    means for generating a time stamp signal; and
    means for latching a time stamp information for the detected packet from a time source.

* * * * *